United States Patent
Kwon (10) Patent No.: US 10,486,638 B2
(45) Date of Patent: Nov. 26, 2019

(54) AIRBAG FOR A VEHICLE

(71) Applicants: HYUNDAI MOTOR COMPANY, Seoul (KR); KIA MOTORS CORPORATION, Seoul (KR)

(72) Inventor: Hyock In Kwon, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 49 days.

(21) Appl. No.: 15/819,015

(22) Filed: Nov. 21, 2017

(65) Prior Publication Data

US 2019/0061676 A1  Feb. 28, 2019

(30) Foreign Application Priority Data

Aug. 24, 2017 (KR) .................. 10-2017-0107330

(51) Int. Cl.
- *B60R 21/16* (2006.01)
- *B60R 21/231* (2011.01)
- *B60R 21/233* (2006.01)
- *B60R 21/2338* (2011.01)
- *B60R 21/207* (2006.01)

(52) U.S. Cl.
CPC ...... *B60R 21/23138* (2013.01); *B60R 21/233* (2013.01); *B60R 21/2338* (2013.01); *B60R 21/207* (2013.01); *B60R 2021/23146* (2013.01); *B60R 2021/23308* (2013.01); *B60R 2021/23382* (2013.01); *B60R 2021/23386* (2013.01)

(58) Field of Classification Search
CPC ............... B60R 21/231; B60R 21/233; B60R 2021/23161; B60R 2021/23308
USPC .................... 280/730.1, 730.2, 743.1, 743.2
See application file for complete search history.

(56) References Cited

U.S. PATENT DOCUMENTS

| | | | |
|---|---|---|---|
| 5,636,862 | A | 6/1997 | Cheung |
| 5,730,464 | A | 3/1998 | Hill |
| 6,959,945 | B2 | 11/2005 | Fischer et al. |
| 8,342,570 | B2 | 1/2013 | Higuchi |
| 8,360,469 | B2 | 1/2013 | Wiik et al. |
| 8,414,018 | B2 | 4/2013 | Choi et al. |
| 8,480,125 | B1 | 7/2013 | Belwafa et al. |

(Continued)

FOREIGN PATENT DOCUMENTS

| | | |
|---|---|---|
| DE | G9405143 | 5/1994 |
| JP | 2006008105 | 1/2006 |

(Continued)

OTHER PUBLICATIONS

Non-Final Office Action in U.S. Appl. No. 15/827,025, dated Jul. 10, 2019, 36 pages.

*Primary Examiner* — Toan C To
(74) *Attorney, Agent, or Firm* — Lempia Summerfield Katz LLC (57) ABSTRACT

An airbag for a vehicle includes a lower chamber and a confining chamber that confine the upper body of an occupant in a seat such that the upper body of the occupant cannot rotate in a lateral direction in the event of a side vehicle impact. The airbag further includes a protecting chamber coming into contact with the head of the occupant, thereby preventing the head of one occupant from colliding with the head of another occupant. The airbag provides secure protection for an occupant from an impact.

10 Claims, 5 Drawing Sheets

(56) References Cited

U.S. PATENT DOCUMENTS

| | | |
|---|---|---|
| 8,480,128 B2 | 7/2013 | Fukawatase et al. |
| 8,632,094 B2 | 1/2014 | Schmidt |
| 8,684,408 B2 * | 4/2014 | Thomas ................ B60R 21/231 |
| | | 280/730.2 |
| 8,690,187 B2 | 4/2014 | Fukawatase |
| 9,016,718 B2 | 4/2015 | Fukawatase et al. |
| 9,180,833 B2 | 11/2015 | Jo |
| 9,227,590 B2 | 1/2016 | Fujiwara |
| 9,266,494 B2 | 2/2016 | Wang |
| 9,505,374 B2 | 11/2016 | Matsuzaki et al. |
| 9,533,648 B2 | 1/2017 | Fujiwara |
| 9,592,788 B2 * | 3/2017 | Wiik ................ B60R 21/23138 |
| 9,598,044 B2 * | 3/2017 | Fujiwara ............... B60R 21/233 |
| 9,771,046 B2 | 9/2017 | Lee |
| 9,809,189 B2 | 11/2017 | Grell |
| 9,994,181 B1 * | 6/2018 | Dubaisi ................ B60R 21/207 |
| 10,023,147 B2 | 7/2018 | Kwon |
| 10,189,432 B2 | 1/2019 | Matsushita |
| 10,259,420 B2 * | 4/2019 | Thomas ................ B60R 21/231 |
| 10,336,283 B2 | 7/2019 | Rickenbach |
| 2004/0051285 A1 | 3/2004 | Fischer |
| 2006/0131847 A1 | 6/2006 | Sato |
| 2007/0108753 A1 | 5/2007 | Pang et al. |
| 2009/0224520 A1 | 9/2009 | Higuchi |
| 2011/0193329 A1 | 8/2011 | Higuchi |
| 2012/0025499 A1 | 2/2012 | Shibayama et al. |
| 2012/0049498 A1 | 3/2012 | Wiik et al. |
| 2012/0091697 A1 | 4/2012 | Wiik et al. |
| 2012/0119475 A1 | 5/2012 | Choi et al. |
| 2013/0076014 A1 | 3/2013 | Thomas |
| 2014/0035264 A1 | 2/2014 | Fukushima et al. |
| 2014/0062069 A1 | 3/2014 | Fukawatase |
| 2014/0097601 A1 * | 4/2014 | Fukawatase .......... B60R 21/231 |
| | | 280/730.2 |
| 2014/0151984 A1 | 6/2014 | Fukawatase et al. |
| 2014/0284906 A1 | 9/2014 | Akiyama |
| 2014/0333051 A1 | 11/2014 | Jo |
| 2015/0076803 A1 | 3/2015 | Fujiwara |
| 2015/0217714 A1 | 8/2015 | Fujiwara |
| 2015/0274111 A1 * | 10/2015 | Ishida ................... B60R 21/207 |
| | | 280/730.2 |
| 2015/0314748 A1 | 11/2015 | Mihm |
| 2016/0107602 A1 * | 4/2016 | Nakashima ........... B60R 21/233 |
| | | 280/728.2 |
| 2016/0114755 A1 | 4/2016 | Matsuzaki et al. |
| 2016/0114757 A1 | 4/2016 | Fujiwara |
| 2016/0159306 A1 | 6/2016 | Fujiwara |
| 2016/0167616 A1 * | 6/2016 | Wiik ................ B60R 21/23138 |
| | | 280/729 |
| 2016/0200278 A1 | 7/2016 | Wiik et al. |
| 2016/0229369 A1 | 8/2016 | Thomas |
| 2017/0129444 A1 | 5/2017 | Fukawatase et al. |
| 2017/0174174 A1 | 6/2017 | Ohno et al. |
| 2017/0182963 A1 | 6/2017 | Hiraiwa et al. |
| 2017/0182969 A1 | 6/2017 | Fujiwara |
| 2017/0334386 A1 * | 11/2017 | Park ..................... B60R 21/2338 |
| 2018/0118150 A1 | 5/2018 | Kwon |
| 2018/0126944 A1 * | 5/2018 | Choi ..................... B60R 21/214 |
| 2018/0290619 A1 | 10/2018 | Kitagawa |
| 2018/0326938 A1 * | 11/2018 | Rickenbach .......... B60R 21/233 |
| 2019/0016293 A1 | 1/2019 | Saso |
| 2019/0047504 A1 * | 2/2019 | Sugishima ............ B60R 21/207 |
| 2019/0054890 A1 | 2/2019 | Kwon |
| 2019/0061675 A1 | 2/2019 | Kwon |
| 2019/0061676 A1 | 2/2019 | Kwon |
| 2019/0092271 A1 | 3/2019 | Park |
| 2019/0152421 A1 | 5/2019 | Byun |
| 2019/0161053 A1 | 5/2019 | Gwon |

FOREIGN PATENT DOCUMENTS

| | | |
|---|---|---|
| JP | 4165239 | 10/2008 |
| JP | 2009137441 | 6/2009 |
| JP | 2009234562 | 10/2009 |
| JP | 2010083414 | 4/2010 |
| JP | 2011240807 A | 12/2011 |
| JP | 2012051557 | 3/2012 |
| JP | 2014051138 | 3/2014 |
| JP | 5594340 | 9/2014 |
| JP | 5754436 | 7/2015 |
| JP | 2016083955 | 5/2016 |
| JP | 2016107721 | 6/2016 |
| JP | 2016203945 | 12/2016 |
| KR | 20080101478 | 11/2008 |
| KR | 20120051279 | 5/2012 |
| KR | 101262977 | 5/2013 |
| KR | 101292323 | 7/2013 |
| KR | 20140132188 | 11/2014 |
| KR | 20150001100 | 1/2015 |
| KR | 101637205 | 7/2016 |
| KR | 1020170067962 | 6/2017 |
| WO | 2014033820 | 3/2014 |
| WO | 2017014421 | 1/2017 |

* cited by examiner

AIRBAG FOR A VEHICLE

CROSS REFERENCE TO RELATED APPLICATION

The present application claims priority to Korean Patent Application No. 10-2017-0107330, filed Aug. 24, 2017, the entire contents of which is incorporated herein for all purposes by this reference.

BACKGROUND

Field of the Disclosure

The present disclosure generally relates to an airbag for a vehicle, the airbag being capable of protecting occupants from an impact and reliably minimizing injury to occupants by confining the occupants in their seats during a car crash.

Description of the Related Art

In regard to vehicles, technologies for ensuring occupant safety, improving driving performance, user convenience, and various functionalities have been developed.

Among various safety devices mounted to vehicles, an airbag system is considered the most effective safety device for protecting occupants from an impact.

Such an airbag system, which is a means for protecting a driver or a passenger during a car crash, includes a crash sensor for detecting a car crash, a controller for operating an airbag in accordance with the detection results of the crash sensor, and an airbag module including an airbag that is operated in accordance with a signal sent from the controller. Airbag modules are classified into driver airbag modules, passenger airbag modules, side impact airbag modules, and loop airbag modules according to installation positions thereof or persons to be protected.

Since upper bodies of occupants in front seats, including a driver seat and a passenger seat, move forward in the event of a side vehicle impact, there is a risk that an occupant in the driver seat and an occupant in a passenger seat collide with each other, with an arm rest, or with the seats, thereby being injured.

The foregoing is intended merely to aid in the understanding of the background of the present disclosure and is not intended to mean that the present disclosure falls within the purview of the related art that is already known to those skilled in the art.

SUMMARY

Accordingly, the present disclosure is made keeping in mind the above problems occurring in the related art. An object of the present disclosure is to provide an air bag for a vehicle. The air bag is capable of protecting occupants from an impact by confining the occupants in their seats in the event of a side vehicle impact.

According to one embodiment, an airbag is provided for a vehicle. The air bag includes a lower chamber provided on one side of a seat and deployed toward a front side when being inflated, thereby being disposed on one side of a torso of an occupant when the lower chamber is inflated. The air bag also includes an upper chamber extending upward from an upper end of the lower chamber and being composed of a protecting chamber and a confining chamber. The protecting chamber is disposed on the one side of the torso of the occupant in an inflated state. The confining chamber is bent downward and connected to the lower chamber, thereby being disposed on the one side of the torso of the occupant.

The protecting chamber may extend from an upper end of a rear portion of the lower chamber, thereby being disposed at one side of a head of the occupant. The confining chamber may extend from an upper end of a front portion of the lower chamber so as to be disposed in front of the protecting chamber. The confining chamber may have a lower portion bent toward a lower end of the protecting chamber and connected to the lower chamber at a lower end thereof.

The confining chamber may be bent outward to extend in a direction of being further away from the occupant sitting in the seat. The confining chamber may be connected to a rear end of the lower chamber at an end thereof.

The airbag may further include an auxiliary chamber provided at a rear end of the confining chamber. The auxiliary chamber may be positioned at a height corresponding to that of an upper end portion of the seat.

The protecting chamber may be disposed at the upper end of the front portion of the lower chamber and extend toward one side of the head of the occupant. The confining chamber may be disposed at the upper end of the rear portion of the lower chamber and be disposed behind the protecting chamber. The confining chamber may have the lower portion bent downward toward the lower end of the protecting chamber and connected to the lower chamber.

The airbag may further include a first guide tether having a first end connected to an end of the protecting chamber and a second end connected to a front end of the lower chamber or to a portion at which the lower chamber and the confining chamber are connected with each other. The first guide tether may cause the protecting chamber to be bent toward the head of the occupant when the airbag inflates to come into contact with the occupant.

The airbag may further include a second guide tether having a first end connected to the seat and a second end connected to a front end of the lower chamber or to a portion where the lower chamber and the confining chamber are connected to each other. The second guide tether may cause the lower chamber and the confining chamber to be bent toward the torso of the occupant when the airbag inflates to come into contact with the occupant.

The airbag may further include a standing-type tether disposed at an occupant's side of the lower chamber and having a first end and a second end fixed to the lower chamber or the seat. The standing-type tether may extend to be wound around an outside surface of the protecting chamber, thereby causing the protecting chamber to be bent toward the head of the occupant when the airbag is inflated and comes into contact with the occupant.

The seat may be a plurality of seats arranged in a lateral direction of a vehicle. The lower chamber may be provided on one side surface of one seat, which faces a side surface of a next seat.

The confining chamber may be supported by an arm rest disposed between the one seat and the next seat when the confining chamber is inflated.

As described above, an airbag for a vehicle, with the structure described above, confines an occupant in a seat in the following manner. A lower chamber and a confining chamber confine the torso of the occupant in the seat so that the torso of the occupant cannot rotate in a lateral direction in the event of a side vehicle impact. A protecting chamber prevents the heads of adjacent occupants from colliding with each other. In this way, the airbag can reliably protect occupants from an impact.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

Hereinbelow, an airbag for a vehicle, according to an embodiment of the present disclosure is described in detail with reference to the accompanying drawings.

Figure 1:
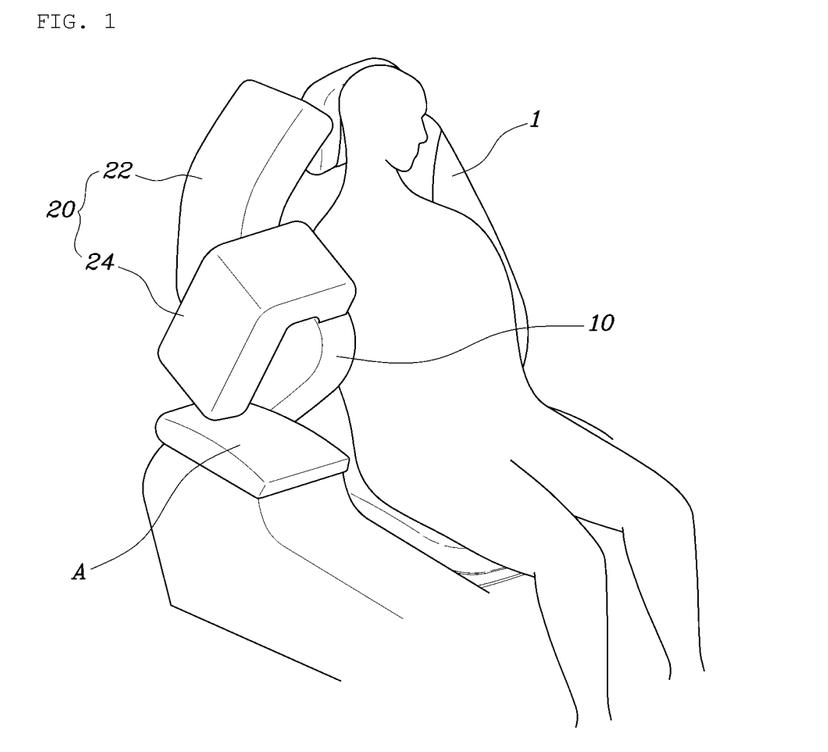
FIG. 1 is a schematic diagram illustrating an airbag for a vehicle according to one embodiment of the present disclosure.
Figure 2:
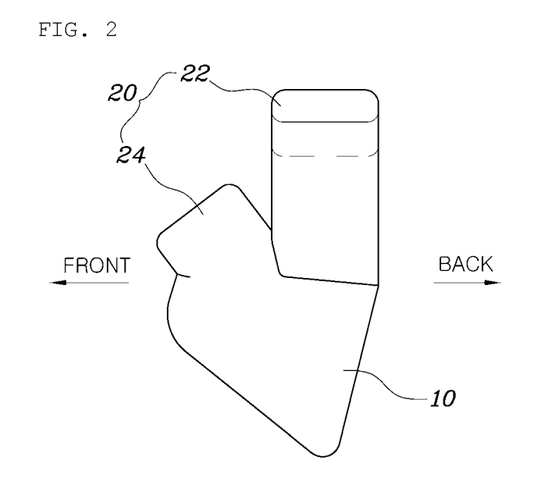
FIGS. 2-9 are diagrams illustrating the airbag of FIG. 1 viewed in various directions.
Figure 3:
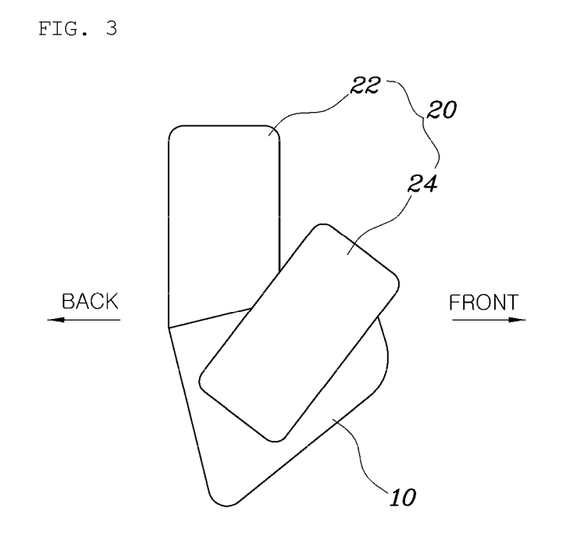
Figure 4:
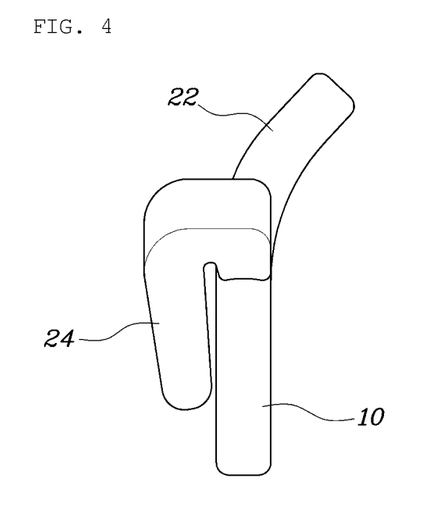

FIG. 1 is a schematic diagram illustrating an airbag for a vehicle, according to one embodiment of the present disclosure. FIGS. 2-9 are diagrams illustrating the airbag of FIG. 1 viewed from various directions.

According to one embodiment of the present disclosure, as illustrated in FIGS. 1-4, an airbag for a vehicle includes a lower chamber 10 provided on one side of a seat 1 and deployed toward a front side when being inflated, thereby being disposed on one side of the torso of an occupant when inflated. An upper chamber 20 extending upward from an upper end of the lower chamber 10. The lower chamber is composed of a protecting chamber 22 and a confining chamber 24. The protecting chamber 22 is disposed on one side of the head of an occupant when inflated. The confining chamber 24 is bent downward and connected to the lower chamber 10, thereby being disposed on one side of the torso of an occupant when inflated.

As described, the airbag of the present disclosure includes the lower chamber 10 and the upper chamber 20. Specifically, the upper chamber 20 is divided into the protecting chamber 22 and the confining chamber 24. Since the airbag is disposed on one side of an occupant when deployed, the airbag may be installed on a side surface of the seat 1. The installation position of the airbag may vary depending on conditions.

For example, a plurality of seats 1 may be arranged in a lateral direction of a vehicle. The seats 1 may include a driver seat and a passenger seat. The airbag may be installed on one side surface of one seat 1, which faces a side surface of the next seat 1. When the airbag is inflated, the protecting chamber 22 can prevent occupants in the adjacent seats from colliding with each other. Furthermore, since the confining chamber 24 limits the lateral movement of an occupant by operating in conjunction with the lower chamber 10, the body of an occupant in a seat may be prevented from being bent sideways.

An arm rest A is disposed between the driver seat and the passenger seat. The confining chamber 24 is supported by the arm rest A disposed between the two seats 1 when the airbag is inflated. The torso of an occupant that is moved in a lateral direction due to a side vehicle impact is supported by the confining chamber 24. Therefore, the torso of the occupant may be prevented from colliding with the arm rest A.

The lower chamber 10 of the airbag of the present disclosure is disposed on one side of the torso of an occupant when inflated, thereby preventing the torso of the occupant from moving in the lateral direction in the event of a side vehicle impact and protecting the occupant from an impact.

The lower chamber 10 is connected to the upper chamber 20 such that the upper chamber 20 extends upward from the upper end of the lower chamber 10. The upper chamber 20 includes the protecting chamber 22 that is arranged on one side of the head of an occupant. When the protecting chamber is inflated, the head of the occupant is protected. The confining chamber 24 also prevents the torso of the occupant from moving in the lateral direction by operating in conjunction with the lower chamber 10. The protecting chamber 22 of the upper chamber 20 is formed to be disposed on one side of the head of an occupant when inflated. When inflated, the confining chamber 24 is bent downward to be connected to the lower chamber 10, thereby being disposed on one side of the torso of an occupant when inflated and limiting the lateral movement of the torso of the occupant by operating in conjunction with the lower chamber 10.

With this arrangement of each chamber of the air bag, the airbag of the present disclosure protects an occupant in the event of a side vehicle impact such that the protecting chamber 22 of the upper chamber 20 protects the head of the occupant and the confining chamber 24 of the upper chamber 20 protects the torso of the occupant by limiting lateral movement of the torso of the occupant. In this way, the airbag of the present disclosure can ensure the safety of the occupant.

A more specific description of the airbag of the present disclosure is given below. With reference to FIG. 1, the protecting chamber 22 extends from an upper end of a rear portion of the lower chamber 10 and is disposed on one side of the head of an occupant. The confining chamber 24 extends from an upper end of a front portion of the lower chamber 10 and is disposed in front of the protecting chamber 22. The confining chamber 24 has a lower portion that is bent downward to extend toward a lower end of the protecting chamber 22 and is connected to the lower chamber 10 at a lower end thereof.

The arrangement in which the protecting chamber 22 extends from the upper end of the rear portion of the lower chamber 10 and the confining chamber 24 is disposed in front of the protecting chamber 22 is a first embodiment of the present disclosure. The airbag arranged in this way can reliably protect an occupant from a side vehicle impact.

Since the protecting chamber 22 extends from the upper end of the rear portion of the lower chamber 10 and is disposed on one side of the head of an occupant, the head of the occupant is prevented from moving in the lateral direction and colliding with an occupant in the next seat in the event of a side impact.

The confining chamber 24 extends from the upper end of the lower chamber 10 and is disposed in front of the protecting chamber 22. The lower portion of the confining chamber 24 is bent downward and extends toward the lower end of the protecting chamber 22. The lower portion of the confining chamber 24 is connected to the lower chamber 10 such that the lower portion of the confining chamber 24 and the lower chamber 10 are disposed together on one side of the torso of the occupant. When the torso of an occupant is moved forward in the event of a side vehicle impact, the confining chamber 24 operates in conjunction with the lower chamber 10 with this arrangement of the airbag, thereby preventing the torso of the occupant from moving in the lateral direction. Since the confining chamber 24 is arranged in front of the protecting chamber 22 and is bent downward to extend toward the lower end of the protecting chamber 22, the front portion of the lower chamber 10 has a sufficient volume due to the presence of the confining chamber 24.

Therefore, the airbag can reliably confine the torso of the occupant in the seat when the torso of the occupant comes into contact with the lower chamber 10 because the lower chamber 10 can stably surround the torso of the occupant.

Meanwhile, as illustrated in FIG. 1, the confining chamber 24 may be bent outward to extend in a direction to become further away from the occupant seating on the seat 1. An end of the confining chamber 24 may be connected to a rear end of the lower chamber 10. In this case, the confining chamber 24 does not interfere with movement of the occupant. When the confining chamber 24 is bent toward the occupant sitting in the seat 1, the confining chamber 24 is likely to strike the occupant so that the occupant may be injured while the confining chamber 24 is being inflated. Therefore, the confining chamber 24 is bent outward to not interfere with movement of the occupant.

Since the confining chamber 24 is bent outward, i.e., toward the opposite side of the occupant sitting in the seat 1, the confining chamber 24 is supported by the arm rest A, which is described above. Therefore, the torso of the occupant is prevented from colliding with the arm rest A.

Figure 5:
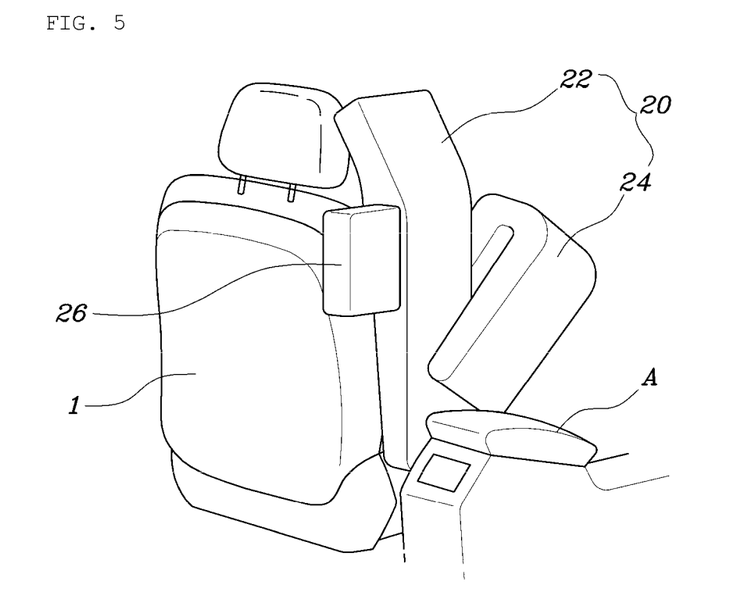

In addition, as illustrated in FIG. 5, a rear end of the confining chamber 24 is provided with an auxiliary chamber 26. The auxiliary chamber 26 is disposed at a height corresponding to an upper end portion of the seat 1.

The auxiliary chamber 26 is disposed at one side surface of the seat 1, which is occupied by the occupant, thereby preventing the head of an occupant sitting in the next seat from colliding with the side surface of the seat 1 in the event of a vehicle side impact. In other words, the auxiliary chamber 26 is intended to protect the occupant sitting in the next seat disposed on one side of the seat 1 provided with the airbag of the present disclosure, as well as protecting the occupant sitting in the seat 1. The vertical dimension (i.e. length) and the horizontal dimension (i.e. width) of the auxiliary chamber 26 are set to prevent the head of the occupant sitting in the next seat from directly colliding with the side surface of the seat 1.

In addition, as illustrated in FIGS. 1-4, the protecting chamber 22 is bent toward the head of the occupant sitting in the seat 1, thereby surrounding the head of the occupant when inflated. Therefore, the protecting chamber 22 can protect the head of the occupant in the seat 1 from an impact and can prevent the head of the occupant from being overly bent.

Figure 8:
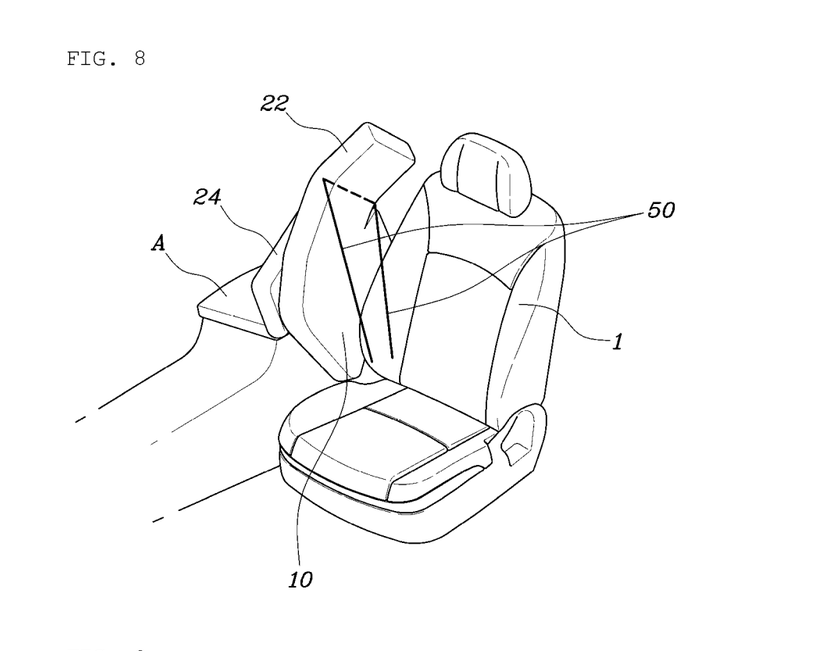
Figure 9:
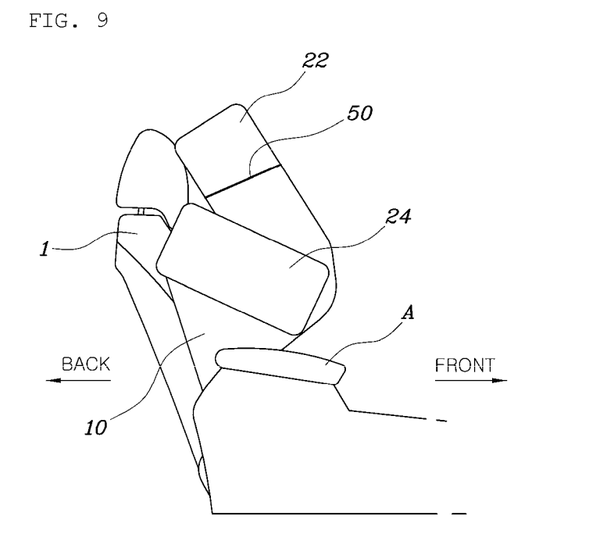

As illustrated in FIGS. 8 and 9, the protecting chamber 22 extends from the upper end of the front side of the lower chamber 10 to one side of the head of an occupant. The confining chamber 24 extends from the upper end of the back side of the lower chamber 10. A lower portion of the confining chamber 24 is bent downward and connected to the lower chamber 10 at a lower end thereof.

The arrangement in which the protecting chamber 22 is disposed to be connected to the front side of the lower chamber 10 and the confining chamber 24 is disposed to be connected the back side of the lower chamber 10 is another embodiment. In this case, an occupant is reliably protected from a side impact, even in the case in which the torso of the occupant is moved forward.

More specifically, the protecting chamber 22 extends from the upper end of the front portion of the lower chamber 10 toward the rear portion of the lower chamber 10. In this case, the protecting member 22 extends obliquely upward while surrounding one side of the head of the occupant. Since the protecting chamber 22 obliquely extends upward from the front portion of the lower chamber 10 toward the rear portion of the lower chamber 10, the head of the occupant is reliably prevented from moving to the next seat, even in a state in which the head of the occupant moves sideways and leans forward due to a side impact.

The confining chamber 24 extends from the upper end of the lower chamber 10 and is disposed behind the protecting chamber 22. The lower portion of the confining chamber 24 is bent toward the lower end of the protecting chamber 22 and connected to the lower chamber 10 at the lower end thereof. Thus, the confining chamber and the lower chamber 10 are disposed on one side of the torso of the occupant. When an impact force pushes the torso of the occupant in a lateral direction in the event of a side vehicle impact, the confining chamber 24 and the lower chamber 10 hold the torso of the occupant to not move in the lateral direction. More specifically, since the confining chamber 24 is arranged behind the protecting chamber 22 and is bent toward the front side of the protecting chamber 22, the lower chamber 10 has a sufficient volume to safely protect the occupant from a side impact. Moreover, when the lower chamber 10 and the confining chamber 24 are pressed by the weight of the occupant due to the movement of the upper body of the occupant, the lower end of the confining chamber 24 first comes into contact with the arm rest A and is then rolled in a direction toward the occupant. Therefore, the lower chamber 10 surrounds the torso of the occupant, thereby stably confining the torso of the occupant.

Figure 6:
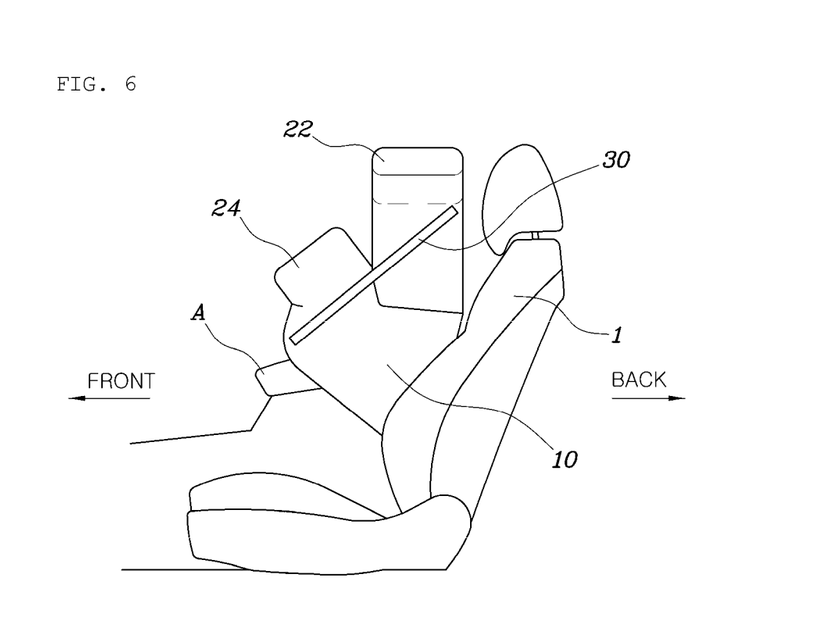

Meanwhile, as illustrated in FIG. 6, the airbag may further include a first guide tether 30 having a first end connected to one end of the protecting chamber 22 and a second end connected to a front end of the lower chamber 10 or to a portion at which the lower chamber 10 and the confining chamber 24 are connected to each other. The first guide tether 30 causes the protecting chamber 22 from being bent toward the head of the occupant when the airbag inflates and comes into contact with the occupant.

Since the first guide tether 30 is connected between an upper end of the protecting chamber 22 and the lower chamber 10, the first guide tether 30 is tautly stretched when the airbag is inflated. When the first guide tether 30 is pushed by the head or the torso of the occupant in the event of a side vehicle impact, the first guide tether 30 pulls the protecting chamber 22 toward the lower chamber 10. The protecting chamber 22 that is pulled toward the lower chamber by the first guide tether 30 is bent toward the head of the occupant, thereby coming into contact with the head and stably supporting the occupant's head. Therefore, the neck of the occupant is prevented from being jerked, thereby minimizing injury to the neck of the occupant.

The protecting member 22 that is pulled by the first guide tether 30 and bent toward the head of the occupant is disposed between the shoulder and the neck of the occupant, thereby reliably preventing the occupant from having whiplash.

Figure 7:
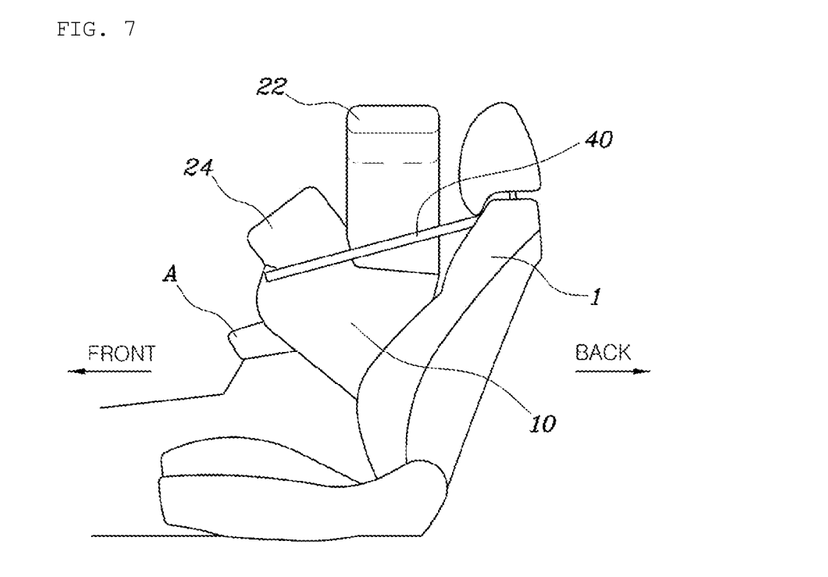

As illustrated in FIG. 7, the airbag of the present disclosure may further include a second guide tether 40 having a first end connected to the seat 1 and a second end connected to a front end of the lower chamber 10 or to a portion at which the lower chamber 10 and the confining chamber 24 are connected to each other. When the airbag inflates to come into contact with the occupant, the second guide tether 40 causes the lower chamber 10 and the confining chamber 24 to be bent toward the torso of the occupant.

Since the second guide tether 40 is connected between the seat 1 and the front end of the lower chamber 10, the second guide tether 40 maintains taut tension when the airbag is inflated. In this state, the second guide tether 40 pulls the front end of the lower chamber 10 when a side impact occurs and the torso of the occupant pushes the second guide tether 40. The lower chamber 10 pulled by the second guide tether 40 is bent toward the torso of the occupant, thereby surrounding and supporting the torso of the occupant. For this reason, the torso of the occupant is not overly moved in the lateral direction but is stably supported. Therefore, injury to the occupant is minimized.

Alternatively, the second guide tether 40 is positioned near the shoulder of the occupant when the second guide tether 40 is connected between the seat 1 and the portion where the lower chamber 10 and the confining chamber 24 are connected to each other. In the case in which the second guide tether 40 is installed near the shoulder of the occupant, the lower chamber 10 is first bent when the torso of the occupant pushes the second guide tether 40 due to a side impact, which causes the protecting chamber 22 to be bent toward the occupant. Therefore, the head of the occupant is stably supported, thereby preventing the occupant from having whiplash and minimizing injury to the neck of the occupant.

Alternatively, as illustrated in FIG. 9, the airbag of the present disclosure may further include a standing-type tether 50. The standing-type tether 50 is disposed at an occupant's side with respect to the lower chamber 10. First and second ends of the standing-type tether 50 are fixed to the lower chamber 10 or the seat 1. The standing-type tether 50 extends obliquely upward in a direction of the opposite side of the occupant from the lower chamber 10 or the seat 1 and winds around the protecting chamber 22. The standing-type tether 50 causes the protecting chamber 22 to be bent toward the head of the occupant when the airbag is inflated.

In other words, the standing-type tether 50 is disposed on the occupant's side with respect to the lower chamber 10. With the first end of the standing-type tether 50 fixed to the seat 1, the standing-type tether 50 first extends obliquely upward and toward the opposite side of the occupant, winds around the outside surface of the protecting chamber 22, and then extends obliquely downward to be fixed to the seat 1 at the second end thereof. As illustrated in FIG. 9, the standing-type tether 50 is wound to extend across the outside surface (i.e. the opposite side surface of the occupant) of the protecting chamber 22. Therefore, the standing-type tether 50 can easily pull the protecting chamber 22 toward the occupant.

As described above, the standing-type tether 50 is wound around the protecting chamber 22 and the respective ends thereof are fixed to the seat 1. Therefore, the standing-type tether 50 is tautly stretched when the airbag is inflated. From this state, the standing-type tether 50 pulls the protecting chamber 22 toward the occupant when the standing-type tether 50 is pushed by the body of the occupant due to a side impact. The protecting chamber 22 pulled by the standing-type tether 50 is bent toward the head of the occupant, thereby coming into contact with the head of the occupant and stably supporting the head of the occupant. Therefore, the occupant is prevented from having whiplash, thereby minimizing injury to the neck of the occupant.

The vehicle airbag having the structure described above can reliably protect an occupant from an impact in the event of a side vehicle event. The lower chamber 10 and the confining chamber 24 protect the body of the occupant by confining the body of the occupant to not rotate in a lateral direction. The protecting chamber 22 protects the head of the occupant by coming into contact with the head of the occupant. The vehicle airbag of the present disclosure can thus protect the occupant from an impact and collision with another occupant.

Although embodiments of the present disclosure have been described for illustrative purposes, those having ordinary skill in the art will appreciate that various modifications, additions, and substitutions are possible without departing from the scope and spirit of the disclosure as disclosed in the accompanying claims.

What is claimed is:

1. An airbag for a vehicle, the air bag comprising:
   a lower chamber provided on one side of a seat and deployed toward a front side when being inflated, thereby being disposed on one side of a torso of an occupant when the lower chamber is inflated; and
   an upper chamber extending upward from an upper end of the lower chamber and being composed of a protecting chamber and a confining chamber, the protecting chamber being disposed on the one side of the torso of the occupant in an inflated state, the confining chamber being bent downward and connected to the lower chamber, thereby being disposed on the one side of the torso of the occupant,
   wherein the protecting chamber extends from an upper end of a rear portion of the lower chamber, thereby being disposed at one side of a head of the occupant, and
   wherein the confining chamber extends from an upper end of a front portion of the lower chamber so as to be disposed in front of the protecting chamber, the confining chamber having a lower portion bent toward a lower end of the protecting chamber and connected to the lower chamber at a lower end thereof.

2. The airbag according to claim 1, wherein the confining chamber is bent outward to extend in a direction of being further away from the occupant in the seat and is connected to a rear end of the lower chamber at an end thereof.

3. The airbag according to claim 1, further comprising an auxiliary chamber provided at a rear end of the confining chamber, the auxiliary chamber being positioned at a height corresponding to that of an upper end portion of the seat.

4. The airbag according to claim 1, wherein the protecting chamber is bent toward the head of the occupant in the seat.

5. The airbag according to claim 1, further comprising a first guide tether having a first end connected to an end of the protecting chamber and a second end connected to a front end of the lower chamber or to a portion at which the lower chamber and the confining chamber are connected with each other, the first guide tether causing the protecting chamber to be bent toward a head of the occupant when the airbag inflates to come into contact with the occupant.

6. The airbag according to claim 1, further comprising a second guide tether having a first end connected to the seat and a second end connected to a front end of the lower chamber or to a portion where the lower chamber and the confining chamber are connected to each other, the second guide tether causing the lower chamber and the confining chamber to be bent toward the torso of the occupant when the airbag inflates to come into contact with the occupant.

7. The airbag according to claim 1, further comprising a standing tether disposed at an occupant's side of the lower chamber and having a first end and a second end fixed to the lower chamber or the seat, the standing tether extending to be wound around an outside surface of the protecting chamber, thereby causing the protecting chamber to be bent toward a head of the occupant when the airbag is inflated and comes into contact with the occupant.

8. The airbag according to claim 1, wherein the seat comprises a plurality of seats arranged in a lateral direction of the vehicle, and wherein the lower chamber is provided on one side surface of one seat, which faces a side surface of a next seat.

9. The airbag according to claim 8, wherein the confining chamber is supported by an arm rest disposed between the seat and a next seat when the confining chamber is inflated.

10. An airbag for a vehicle, the air bag comprising:
a lower chamber provided on one side of a seat and deployed toward a front side when being inflated, thereby being disposed on one side of a torso of an occupant when the lower chamber is inflated; and
an upper chamber extending upward from an upper end of the lower chamber and being composed of a protecting chamber and a confining chamber, the protecting chamber being disposed on the one side of the torso of the occupant in an inflated state, the confining chamber being bent downward and connected to the lower chamber, thereby being disposed on the one side of the torso of the occupant,
wherein the protecting chamber is disposed at an upper end of a front portion of the lower chamber and extends toward one side of a head of the occupant, and
wherein the confining chamber is disposed at an upper end of a rear portion of the lower chamber and disposed behind the protecting chamber, the confining chamber having a lower portion bent downward toward a lower end of the protecting chamber and connected to the lower chamber.

* * * * *